(No Model.) 6 Sheets—Sheet 1.
Z. T. FRENCH & W. C. MEYER.
MACHINE FOR CUTTING AND EMBOSSING BUTTON HOLES.
No. 381,995. Patented May 1, 1888.
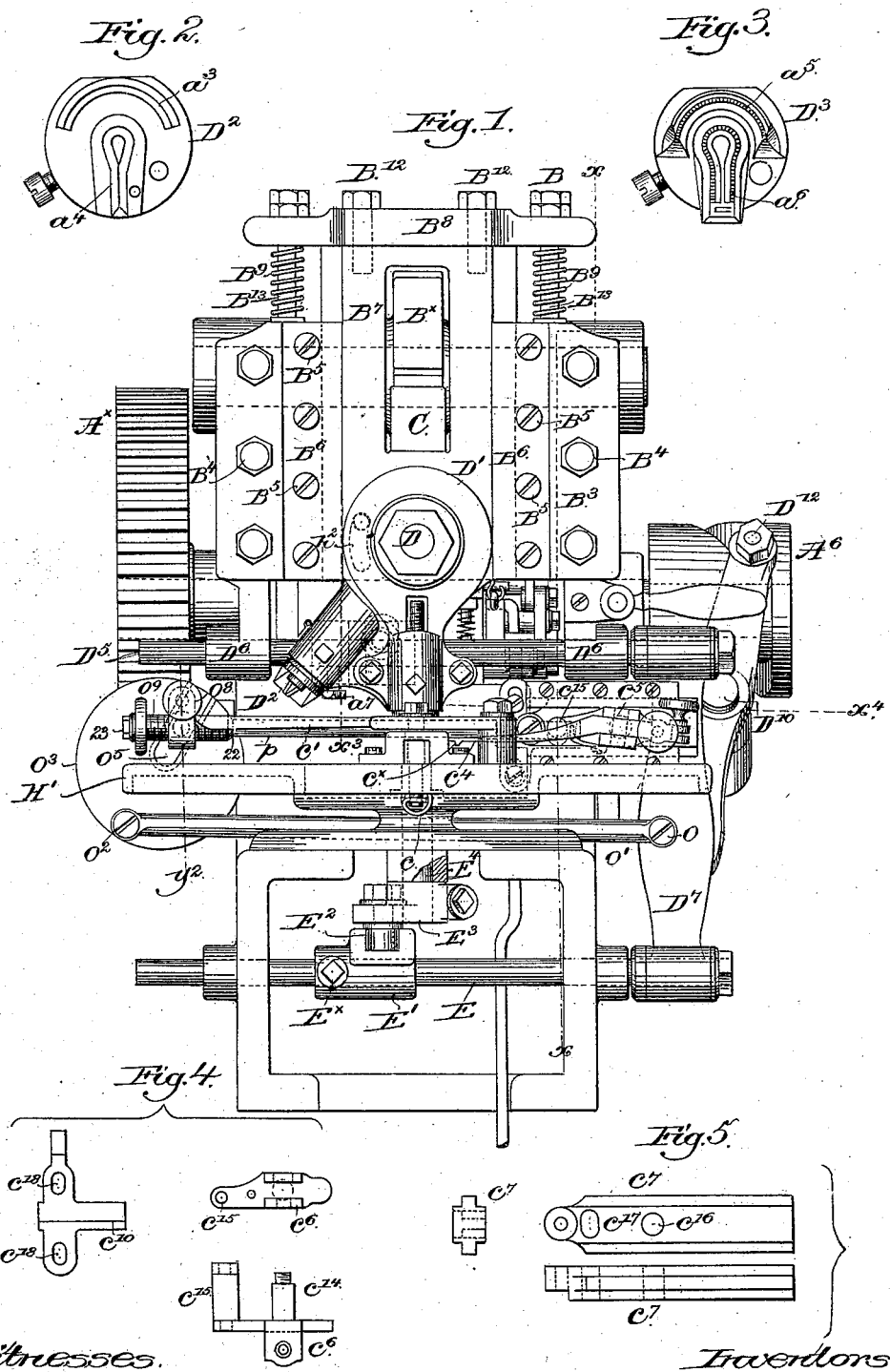

(No Model.) 6 Sheets—Sheet 2.
Z. T. FRENCH & W. C. MEYER.
MACHINE FOR CUTTING AND EMBOSSING BUTTON HOLES.
No. 381,995. Patented May 1, 1888.
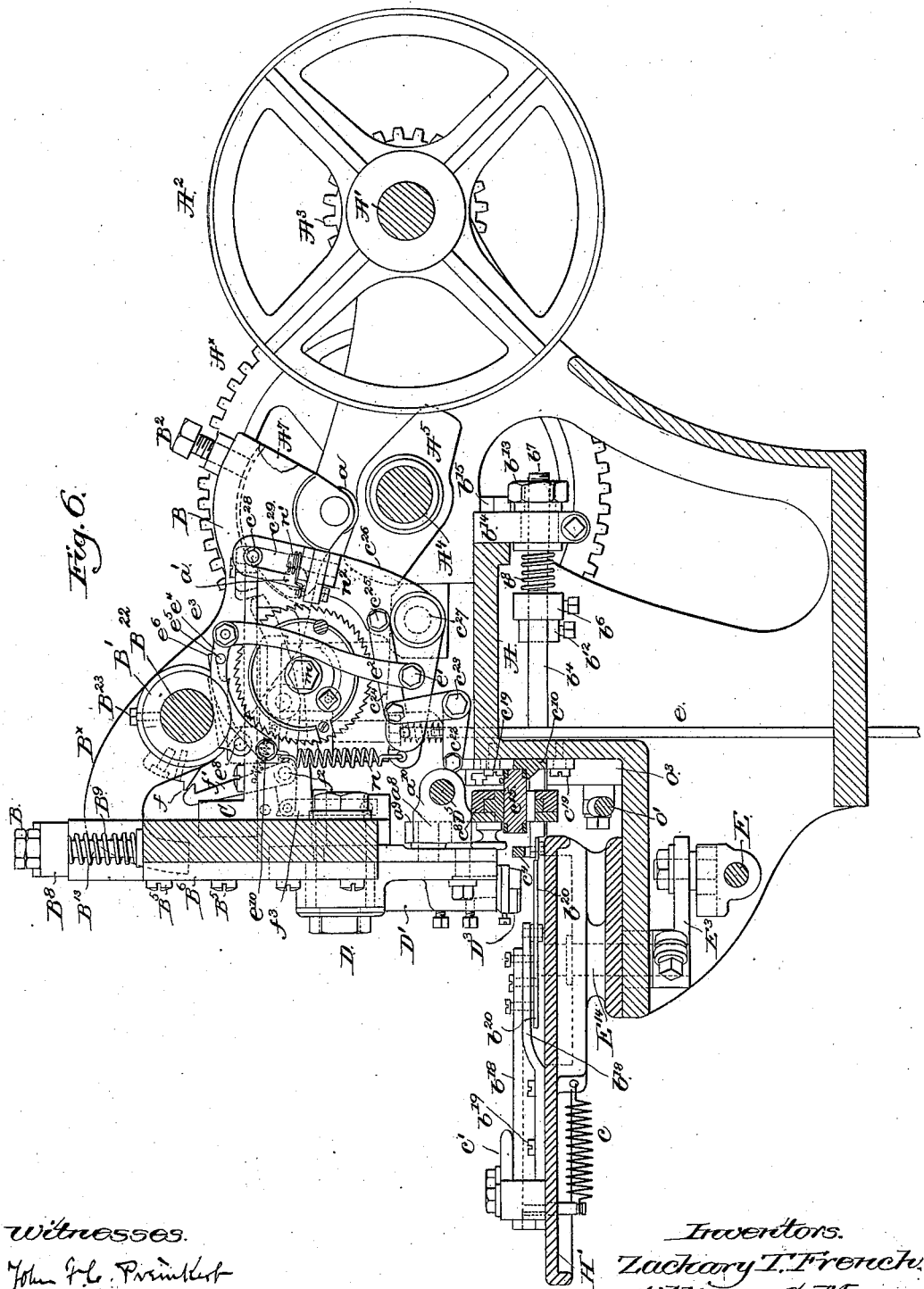

(No Model.) 6 Sheets—Sheet 3.
Z. T. FRENCH & W. C. MEYER.
MACHINE FOR CUTTING AND EMBOSSING BUTTON HOLES.
No. 381,995. Patented May 1, 1888.
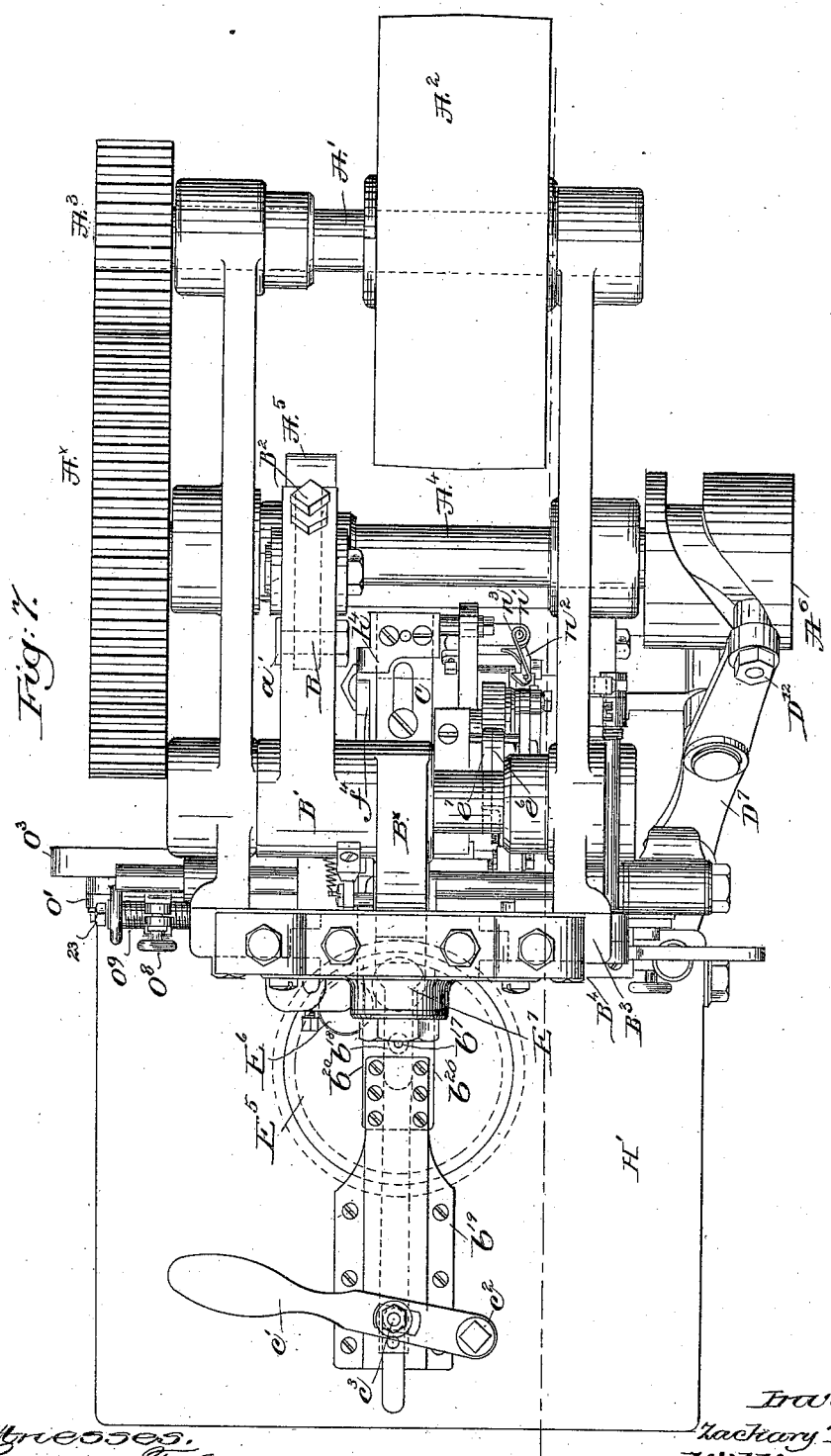
Witnesses.
Howard F. Eaton.
John F. C. Prinkhert
Inventors
Zachary T. French
William C. Meyer,
by Crosby & Gregory
attys.

(No Model.) 6 Sheets—Sheet 4.
Z. T. FRENCH & W. C. MEYER.
MACHINE FOR CUTTING AND EMBOSSING BUTTON HOLES.
No. 381,995. Patented May 1, 1888.
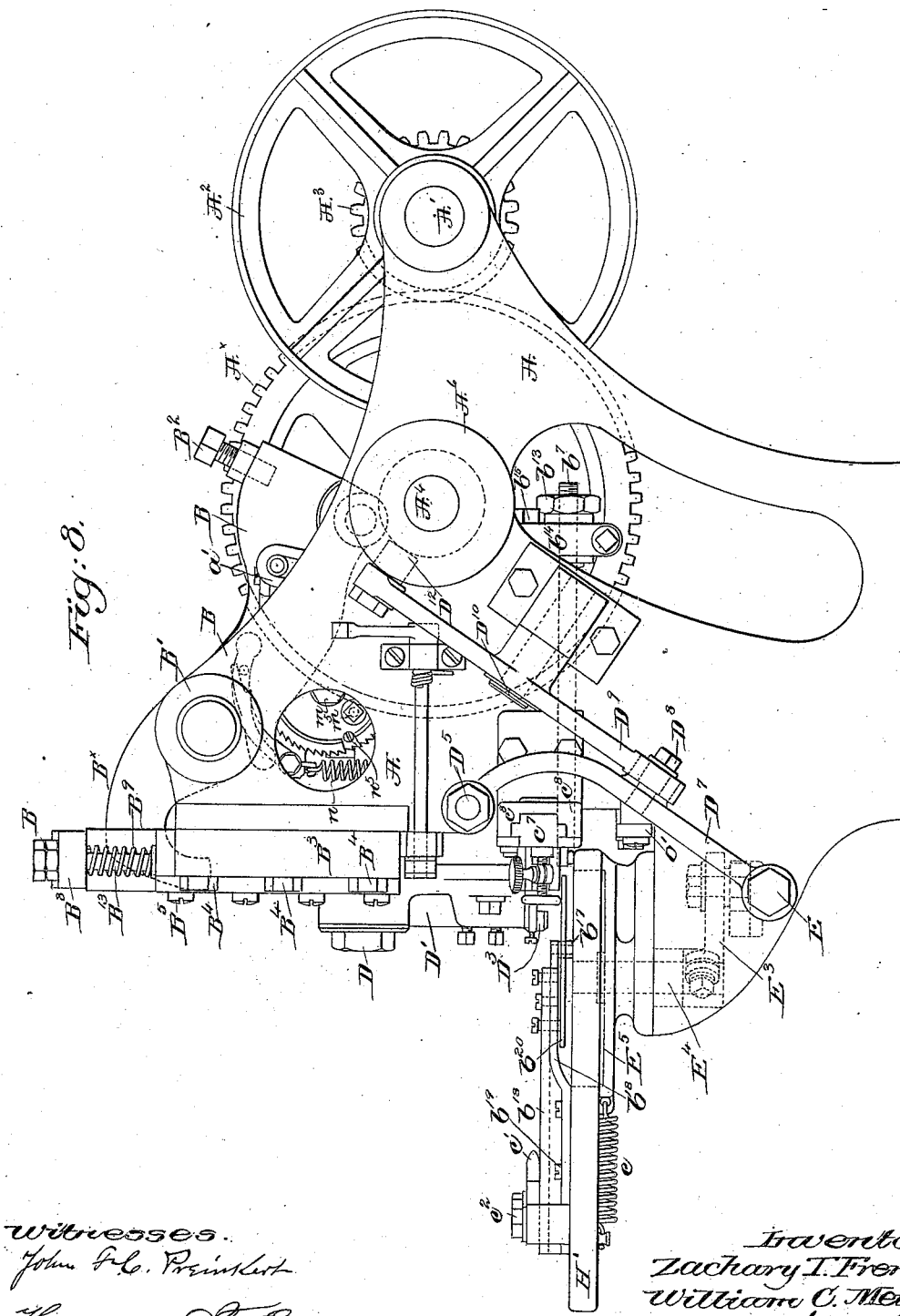

(No Model.) 6 Sheets—Sheet 5.
Z. T. FRENCH & W. C. MEYER.
MACHINE FOR CUTTING AND EMBOSSING BUTTON HOLES.
No. 381,995. Patented May 1, 1888.
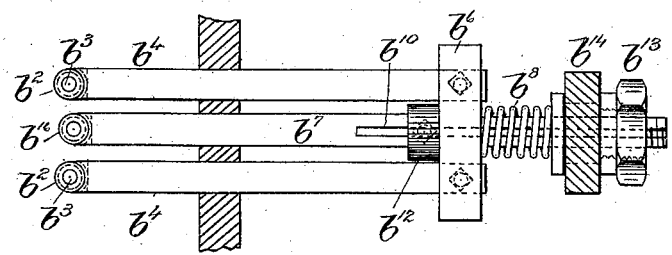
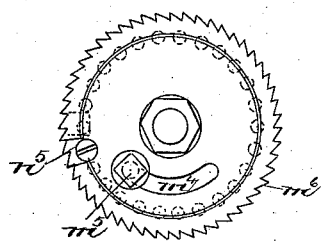 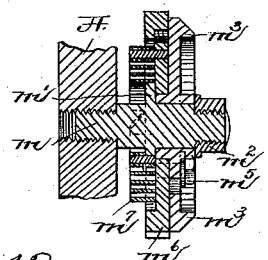
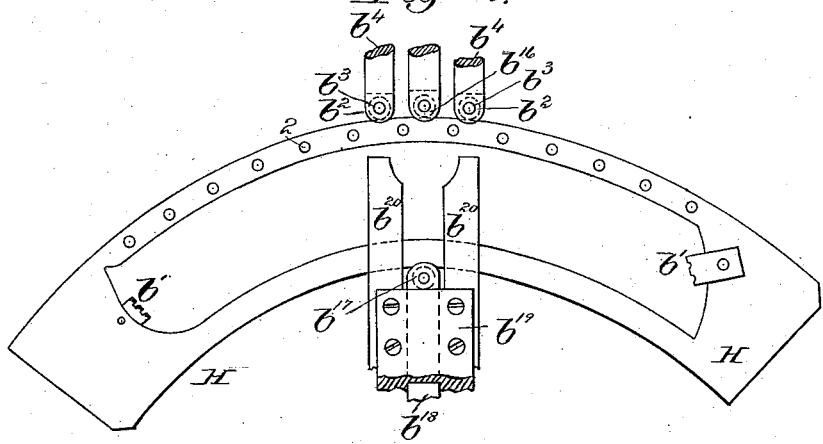
Witnesses.
Inventors
Zachary T. French.
William C. Meyer.
by Crosby & Gregory.
Attys
N. PETERS, Photo-Lithographer, Washington, D. C.

(No Model.) 6 Sheets—Sheet 6.
Z. T. FRENCH & W. C. MEYER.
MACHINE FOR CUTTING AND EMBOSSING BUTTON HOLES.
No. 381,995. Patented May 1, 1888.
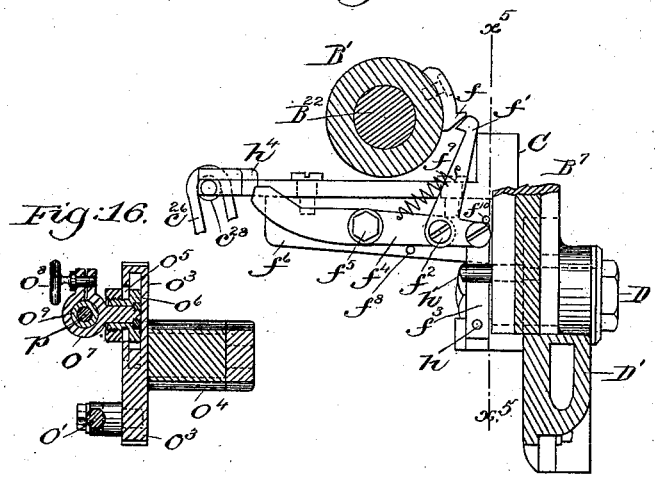
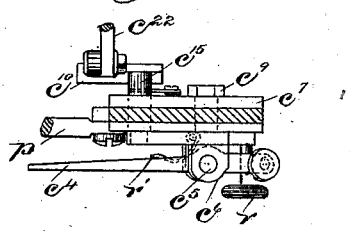
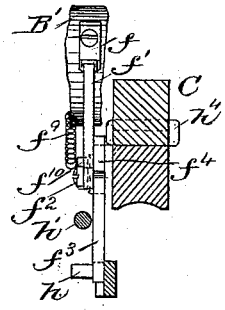
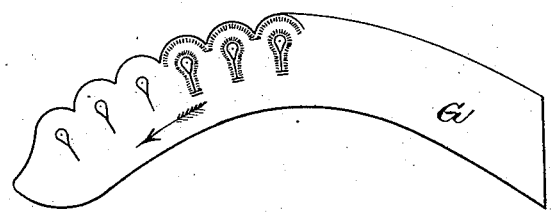
Witnesses.
Howard F. Eaton.
John F. C. Prescott.
Inventors
Zachary T. French,
William C. Meyer.
By Crosby & Gregory,
Attys

UNITED STATES PATENT OFFICE.

ZACHARY T. FRENCH AND WILLIAM C. MEYER, OF BOSTON, MASSACHUSETTS.

MACHINE FOR CUTTING AND EMBOSSING BUTTON-HOLES.

SPECIFICATION forming part of Letters Patent No. 381,995, dated May 1, 1888.

Application filed August 30, 1887. Serial No. 248,277. (No model.)

*To all whom it may concern:*

Be it known that we, ZACHARY T. FRENCH and WILLIAM C. MEYER, both of Boston, county of Suffolk, and State of Massachusetts, have invented an Improvement in Machines for Cutting and Embossing Button-Holes, of which the following description, in connection with the accompanying drawings, is a specification, like letters on the drawings representing like parts.

This invention has for its object to improve the construction of that class of machines wherein a button-piece or fly may be both cut to form a button-hole and embossed about the edge of the hole to represent stitching, as in United States Patent No. 364,148, dated May 31, 1887, and as herein shown the said button-piece is also scalloped at its edge.

In accordance with our invention the material to be cut and embossed and scalloped is laid within a strip-carrier, preferably made as an arc-shaped piece of metal, having an opening therein of the form and size of the button-piece. This strip-carrier, held between guides, is engaged and moved intermittingly by a novel feeding finger or device to thus place the button-piece in position to be acted upon by the cutting and scalloping tool, and thereafter by the embossing-tool, as will be described.

The particular features in which our invention consists will be pointed out in the claims at the end of this specification.

Figure 1 is a front elevation of a machine embodying our invention. Fig. 2 is an under side view of one of the tools employed to cut the button-hole stitch and scallop the edge of the button-piece. Fig. 3 is an under side view of the tool used to emboss the edge of the button-hole slit and also the material just within the scalloped edge of the button-piece. Figs. 4 and 5 represent details of the machine to be referred to. Fig. 6 is a vertical section of the machine shown in Fig. 1 in the line $x$. Fig. 7 is a top or plan view. Fig. 8 is a right-hand side view of the machine shown in Fig. 1. Fig. 9 is a detail showing the guides for the edge of the strip-carrier. Figs. 10 and 11 are side elevation and section of a ratchet-wheel and counting-wheel to determine the number of button-holes to be cut in each button-piece. Fig. 12 shows the strip-carrier and top of the oscillating bed under it, together with the guides, partially shown in Fig. 9, and a stripper, to be described. Fig. 13 is a partial section in the line $x^3$, Fig. 1. Fig. 14 is a sectional detail below the dotted line $x^4$, Fig. 1, chiefly to show the feeding devices and co-operating parts. Fig. 15 is a section of Fig. 13 in the line $x^5$, looking to the left. Fig. 16 is a partial section in the line $y^2$, Fig. 1. Fig. 17 represents a button-piece or fly, a part of which is simply cut and scalloped, while another part is embossed.

The frame-work A, of proper shape to hold the working parts, has a power-shaft, A', provided with a belt-receiving wheel, A$^2$, and a pinion, A$^3$, which engages a toothed gear, A*, fast on a cam shaft, A$^4$, provided with a double-throw cam, A$^5$, and a cam-hub, A$^6$. The double-throw cam, A$^5$, at each rotation of the shaft A$^4$, meets twice the anti-friction roll $a$, mounted in a yoke, A$^7$, pivoted on a stud, $a'$, (see full and dotted lines, Fig. 7, and dotted lines only, Fig. 6,) the said yoke being pivoted in the recessed or slotted end of the arm B, attached to a rock-shaft, B', the said yoke being made adjustable by a screw, B$^2$, so that the arm B may have its throw varied, as may be desired. The rock-shaft B' has a second arm, B*, which is extended forward to the front part of the machine.

The face-plate B$^3$ is secured firmly to the frame-work by bolts B$^4$, and to the face-plate is attached, by screws B$^5$, caps B$^6$, of suitable shape to receive between them and serve as caps for the slide-bar B$^7$, slotted near its upper end for the entrance of the arm B* of the rock-shaft B', so that the said rock-shaft and arm effect the reciprocations of the said slide-bar. The upper end of the slide-bar B$^7$ has attached to it, by screws B$^{12}$, a cross-bar, B$^8$, through which are extended loosely two studs, B$^{13}$, erected upon the face-plate and surrounded below the said cross bar with strong spiral springs B$^9$, the said springs normally acting to lift the slide-bar.

The slot in the slide-bar (see Fig. 1) is of sufficient size to receive not only the arm B* of the rock-shaft B', but also a tongue, C, to be described, the latter having combined with it mechanism, to be described, whereby it may be moved horizontally at the proper time to stop or start the movement of the slide-bar, the latter standing still so long as the tongue is retracted into the position shown in Fig. 6, as in such position the downturned toe (shown chiefly by dotted lines in Fig. 6) of the arm B*, moved continuously, descends past the end of the tongue C and does not depress the slide-bar; but when the operator desires to depress the slide-bar in unison with the arm B*, then the tongue C is thrown forward, so that its enlarged end is interposed in the path of the toe of the arm B*, so that the latter strikes the tongue, it lying upon the bottom of the slot in the slide-bar and depressing it.

The slide-bar $B^7$ has a stud, D, which serves as a pivot for the oscillating tool carrier D', to which are secured, as herein shown, the button-hole cutting and scalloping tool $D^2$ and the button-hole and edge-embossing tool $D^3$, under side views of which are shown, respectively, in Figs. 2 and 3. The tool $D^2$ has a curved blade, $a^3$, and a slit-cutter, $a^4$. The tool $D^3$ has two embossing-surfaces, $a^5$ and $a^6$, the former to emboss the scalloped edge of the button-piece, and the latter to emboss the material in the imitation of stitching about the edge of the button-hole slit.

The carrier D' at its rear side has a stud, $a^8$, (see dotted lines, Fig. 6,) upon which is mounted a loose slide-block, $a^9$, the said slide-block entering between two like lugs or ears of a slide, $a^{10}$, secured by a suitable screw, $a^7$, to a rod, $D^5$, adapted to slide freely horizontally in bearings $D^6$, forming part of the frame-work. The slide-rod $D^5$ has attached to it at one end a cross-head, $D^7$, which at its other end is secured to a slide-rod, E. The cross-head $D^7$ has a bolt or stud, $D^8$, over which is fitted one end of a lever, $D^9$, having its fulcrum at $D^{10}$, the opposite end of the said lever having a roller or other stud, $D^{12}$, which enters a cam-groove in the hub $A^6$, the latter in its rotation moving the lever $D^9$ and causing the slide-rods $D^5$ and E to be reciprocated horizontally in the same direction.

In the reciprocation of the slide-rod $D^5$ the ears of the slide $a^{10}$, acting upon the slide-block $a^9$, spring the tool-carrier on its pivot D, so that at one reciprocation of the slide-bar $B^7$ the scallop and slit-cutting tool $D^2$ is placed in position to descend upon the button-piece at the next descent of the said slide-bar $B^7$. The embossing-tool $D^3$, by a change of position of the tool-carrier D', is left in position to descend upon and emboss the button-piece, the two descents of the slide-bar $B^7$ being made as herein provided for during each complete rotation of the shaft $A^4$.

The slide-rod E has bolted or clamped to it by a screw, E*, a block, E', provided with a slot, which receives in it a roller or other stud, $E^2$, (see Fig. 1,) secured to a crank or arm, $E^3$, clamped upon the lower end of the shank $E^4$ of an oscillating bed, $E^5$, to which is secured the scallop and slit die $E^6$, (see Fig. 7,) which consists, as herein shown, of smooth brass or other soft metal, and the embossing-die $E^7$, (shown in dotted line in Fig. 7,) it being preferably composed of a disk of leather or equivalent soft material. The reciprocations of the slide rod E cause the bed to be oscillated to place the die $E^6$ under the button-hole cutting and scalloping tool $D^2$ when it is to descend and to place the embossing-die $E^7$ under the embossing-tool $D^3$ when it is in position to descend upon the button-piece.

The piece of material, G, to be cut and embossed is placed in the open space between the side walls of the strip carrier H, the said piece or blank corresponding externally with the shape of the space in the strip-carrier.

Fig. 17 shows the piece of material as partially scalloped and slit, and a little farther on the edges of the scallop and the edges of the slit are shown embossed.

The strip-carrier H, herein shown as an arc-shaped piece of metal, is cut out to form a space corresponding in shape with the button-piece. This strip-carrier is adapted to be moved step by step or intermittingly over a bed-plate, H', by a feeding device, which will be described. The strip-carrier H, at its upper and lower sides, has suitable fingers, as b', which aid in retaining the button-piece within the recess of the carrier. The convexed edge of the strip-carrier is in practice pressed against three rolls, two of which are marked $b^2 b^2$, while the third roll is marked $b^{16}$. (See Figs. 9 and 12.) The rolls $b^2$ are mounted upon studs $b^3$ of sliding fingers $b^4$, properly bolted to a cross-head, $b^6$, the said cross-head being loosely mounted upon the shank of a finger, $b^7$, which is rigidly but adjustably held, as will be described. The finger $b^7$ is extended through a spiral or other spring, as $b^8$, located between the cross-head $b^6$ and the lug $b^{14}$, bolted to the frame-work, the rear end of the said finger receiving upon it a thumb or other nut, the rotation of which enables the operator to adjust the finger $b^7$ longitudinally or laterally away from or toward the strip-carrier H. The finger $b^7$, it carrying the roll $b^{16}$, is splined, as at $b^{10}$, to receive a suitable key attached to the cross-head $b^6$. The finger $b^7$, next the cross-head $b^6$, has secured to it by a suitable screw a collar, $b^{12}$, the collar limiting the forward motion of the cross-head $b^6$, and consequently of the rolls $b^2$. The threaded nut $b^{13}$ engages the threaded rear end of the finger $b^7$, so that the rotation of the said nut enables the said finger to be adjusted with the fingers according to the distance it is desired that the outer end of the button-hole shall be started back from the convexed edge of the strip-carrier.

The fingers $b^4$ and $b^7$, with their attached rolls, constitute an edge-guide for the strip-carrier H, and the spring $b^8$ permits the fingers $b^4$ to slide independently of the finger $b^7$, thus enabling the rolls $b^2$ and $b^{16}$ to adapt themselves properly to the convexed edge of the strip-carrier H no matter what may be its curvature, the said edge of the strip-carrier being kept pressed against the said guide by means of a roll, $b^{17}$, (see Figs. 7, 8, and 12,) mounted on a stud of a slide-bar, $b^{18}$, held loosely in a guide, $b^{19}$, attached by suitable screws, as in Fig. 7, to the bed H'. This slide-bar $b^{18}$ is normally held forward with its roll against the convexed edge of the strip-carrier H by a spiral spring, $c$, (see Figs. 6 and 8,) attached to the bed H', and also to a stud of the said slide-bar, a hand-lever, as $c'$, pivoted at $c^2$, and slotted to embrace a pin or stud, $c^3$, of the slide-bar $b^{18}$, enabling the operator to move the said bar away from the said edge-gage whenever it is desired to remove or insert a strip-carrier. The guide $b^{19}$ has secured to it a stripper, $b^{20}$, (shown best in Fig. 12,) which in practice is extended across the strip-carrier and the blank therein to prevent the said blank from being lifted from the strip-carrier as the cutting or embossing tool rises after having performed its work. The surface of the rotating table is sunk into the top of the bed H' so that the face of the table is flush with the face of the bed.

The strip-carrier H is provided at its convexed edge (see Fig. 12) with a series of holes, as 2, one for each button-hole slit to be cut, each hole being substantially in line with the button-hole slit to be cut. These holes are entered intermittingly by a feeding device, (shown in Fig. 1 and in detail, Fig. 14, as a finger, $c^4$,) it having a teat, $c^*$, (see Fig. 1,) to enter the said holes 2, one after the other. The finger $c^4$ is pivoted at $c^5$, between ears of a block, $c^6$, having at its rear side two studs, $c^{14}$ and $c^{15}$, the said studs entering, respectively, holes $c^{16}$ and $c^{17}$ (see Fig. 5) in a slide, $c^7$, arranged to be reciprocated in guides $c^8$. (See Fig. 8.) The stud $c^{14}$, extended through the hole $c^{16}$, has applied to it a nut, $c^9$, the said stud serving as the pivotal point for the block $c^6$.

The stud $c^{15}$, preferably made as a roller-stud, as shown best in Fig. 4, is arranged to travel upon a track, $c^{10}$, slotted, as at $c^{18}$, to receive bolts, as $c^{19}$, (see Fig. 6,) so that the said track may be raised and lowered, for the purposes to be described. The track $c^{10}$ (see Fig. 6) is jointed at its upper end by a suitable pin to an elbow-lever, $c^{22}$, having its fulcrum at $c^{23}$, and joined by a link, as $c^{24}$, to a stud, $c^{25}$, secured to an elbow-lever, $c^{26}$, having its fulcrum at $c^{27}$.

The feeding device is reciprocated constantly, even when the slide-bar $B^7$ is at rest, and at such times as it is desired that the feed should stop. When the slide-bar is at rest, the end of the tongue C, as before described, is thrown backward, as in Fig. 6, its stud $c^{28}$ being in the slot $c^{29}$ of the elbow-lever $c^{26}$, and in such position the track $c^{10}$ is held elevated, so that the teat of the feeding-finger cannot enter the holes 2; but whenever the tongue C is thrown forward the upper end of the lever $c^{26}$ is thrown forward, carrying with it the tongue C. Then the track $c^{10}$ is so lowered as to permit the feeding-finger $c^4$ to descend and feed the strip-carrier H intermittingly. The lever $c^{26}$ has connected to its lower end a rod, $e$, which at its lower end will in practice be connected with a suitable treadle under the control of the foot of the operator, the latter depressing the said treadle and throwing forward the tongue C whenever it is desired to force downward the slide-bar $B^7$. This lever $c^{26}$ has jointed loosely to it by a stud, $e'$, a link, $e^2$, which at its upper end is loosely jointed by a stud, $e^3$, to a pawl-raising link, $e^4$, having a stud, $e^5$, upon which rests the end of two pawls $e^6$ $e^7$, (see Fig. 7,) the pawl $e^6$ being pivoted at $e^8$ on a lug or ear of the hub, secured to the rock-shaft B' by a set-screw, $B^{23}$. The pawl $e^7$ is pivoted upon the frame-work of the machine by a stud in line with the stud $e^8$, and therefore not visible on the drawings. The end of the link $e^4$ is pivoted at $e^{10}$ to the frame-work.

The hub has suitably secured to it a hook, $f$, which at times engages the hooked end of an elbow-shaped catch, $f'$, pivoted at $f^2$, the opposite end of the said elbow-catch having pivoted to it a link, $f^3$. (Shown by dotted lines in Fig. 6. See also Fig. 13.) The descent of the right-hand end of the lever $f^4$ (see Fig. 13) is arrested by a stop, $f^8$, a spring, $f^9$, connecting the lever $f^4$, and the catch $f'$ normally drawing the catch $f'$ toward the hook; but a pin, $f^{16}$, arranged near the catch, prevents the upper end of the catch from passing too far toward the hub. The link $f^3$ at its lower end has a stud, $h'$, and the rear side of the tool-carrier D' has extended from it through a slot in the slide $B^7$ a stud, $h^2$, (see dotted lines, Fig. 1,) the said stud $h^2$ passing in far enough to reach and act upon the stud $h'$ at certain times. The shank of the tongue C has a projection, as $h^4$, (see Figs. 7 and 13,) with which the lever $f^4$ acts to form a locking device to retain the tongue C backward, so that the operator cannot start the machine when the embossing-tool $D^3$ is immediately in position to descend upon the button-piece, the object being to always first cut the button-hole slit and then during the same rotation of the shaft $A^4$ permit the tool $D^3$ to descend and emboss the edge of the button-hole.

In operation the hub is rocked by the cams $A^5$, and at each oscillation the hook $f$ passes below the shoulder of the catch $f'$; but should the embossing-tool $D^3$ be in position to descend upon the material when the operator by the treadle moves the lever $c^{26}$ to start the machine, then the pin $h'$, acting on the pin $h$ of the link $f^3$, holds the catch $f'$ out of range of the hook $f$, and also holds the opposite end of the lever $f^4$ against the projection $h^4$. The frame-work A has upon it a stud, $m$, having a collar, $m'$. (See Fig. 11.) Between its collar $m'$ and the nut $m^2$ the stud receives upon it loosely a beveled-edge wheel, $m^3$, the said wheel being slotted, as at $m^4$, to receive a bolt, as $m^5$, by which to secure the said wheel $m^3$ to a ratchet-wheel, $m^6$.

At the rear side of the ratchet-wheel is a coiled spring, $m^7$, the upper end of which is attached to a pin extending from the ratchet-wheel, while the inner end of the spring is attached to a stud extended from the collar $m'$ of the stud $m$. This ratchet-wheel is rotated intermittingly by the pawl $e^6$, and retrograde motion is prevented by the pawl $e^7$. The lower end of the elbow-lever $c^{26}$ is normally kept elevated by the spiral spring $n$. The lever $c^{26}$ has pivoted upon it at $n'$ a catch, $n^2$, which is normally acted upon by a spring, as $n^3$, the latter causing the hook to engage the edge of the beveled-edge wheel $m^3$ when the lever $c^{26}$ is thrown forward by the depression of the treadle. The movement of the lever $c^{26}$, as described, to engage the hook $n^2$ with the beveled-edge wheel depresses the link $e^2$ and stud $e^5$ on the link $e^4$, so that the pawl $e^6$ engages the teeth of the ratchet-wheel and rotates it on the stud $m$ at each backward movement of the hub of the rocker-shaft. The rotation of this ratchet-wheel is continued, and the slide-bar $B^7$ is depressed and the tool-carrier is shifted thereon to first cause the button-hole and scalloping tool to operate and then the embossing-tool to operate intermittingly until in the rotation of the ratchet-wheel the slotted portion $n^5$ (see Fig. 10) of the beveled-edge wheel $m^3$ rises opposite the catch $n^2$, when the spring $n$ immediately acts to throw back the upper end of the lever $c^{26}$ and draw back with it the tongue C and stop the reciprocation of the slide $B^7$. The slot $m^4$ in the beveled-edge wheel permits it to be adjusted with relation to the ratchet-wheel, so that the machine will be stopped sooner or later, that depending upon the number of button-hole slits to be cut in the button-piece then placed in the carrier. The cross-bar $D^7$ (see Fig. 1) has attached to it by a screw, $o$, a connecting-rod, $o'$, which at its opposite end is joined by a screw-stud, $o^2$, to a disk, $o^3$, (see also Fig. 16,) having a central stud at its rear side, which enters a bearing, as $o^4$, attached to the frame-work.

The disk $o^3$ has a slot, $o^5$, in which is placed a radially-adjustable bearing, $o^6$, the said bearing receiving in it the shank of a threaded clamp-nut, $o^7$, the said nut having a clamp-screw, $o^8$, and fitting a threaded sleeve, $o^9$, mounted loosely upon a connecting-rod, $p$, between a collar, 22, and a nut, 23, fast on the said rod. The opposite end of the rod $p$ (see Fig. 14) is jointed to the block $c^7$, (shown separately in Fig. 5,) the rotation of the threaded sleeve in the said clamping-nut drawing the block $c^7$ more or less to the right or left to thereby adjust the feeding device mounted on the said block in such position that the feeding-finger may move the strip carrier to leave it in just the proper position, the adjustment of the bearing-nut in the slot varying the length of the feeding-stroke. The feeding-finger $c^4$ has at its rear end an adjusting device, (shown as a screw, $r$,) the inner end of which abuts against the block $c^7$, a spring, $r'$, normally keeping the screw against the said block, rotation of the screw moving the feeding-finger toward or from the rod $p$, so as to enable the teat $c^*$ to correctly enter the holes 2 of the strip-carrier H.

We do not desire to limit our invention to the exact form of locking mechanism between the tool-carrier and the tongue C to prevent it from being pushed forward to reciprocate the slide $B^7$ when the embossing-tool $D^3$ is in position to descend upon the button-piece; and so, also, we do not desire to limit our invention to the exact mechanism shown by which to automatically withdraw the tongue C and stop the reciprocation of the slide-bar and the movement of the carrier H.

The particular construction of the tools $D^2$ $D^3$ is not herein claimed, as said tools were invented by one of us and have been made the subject of an application for patent, Serial No. 252,329, filed October 14, 1887.

We claim—

1. The slide-bar $B^7$ and guides in which it reciprocates, combined with the tool-carrier carried by it, the button-hole-slit-cutting tool, and the embossing-tool, to operate substantially as described.

2. The slide-bar $B^7$, guides in which it is reciprocated, and the tool-carrier pivoted on the said slide-bar, combined with the rocker having the arms B $B^*$, and with the tongue adapted to be moved into and out of operation when it is desired to reciprocate or leave at rest the said slide-bar, substantially as described.

3. The slide-bar $B^7$, guides in which it is reciprocated, and the tool-carrier pivoted on the said slide-bar, combined with means, substantially as described, to oscillate the said tool-carrier, for the purposes set forth.

4. The slide-bar $B^7$, the pivoted tool-carrier and its attached tools, the tongue and the rocker having arms B and $B^*$, and with the shaft $A^4$ and the double-throw cam, to operate the said rocker twice during each rotation of the said shaft, substantially as and for the purpose set forth.

5. The slide-bar $B^7$, the pivoted tool-carrier, its tools, and the tongue and rocker having arms B and $B^*$, the former provided with an adjustable yoke, $A^7$, having a roller, $a$, combined with the shaft $A^4$ and cam to act upon the said roll, substantially as described.

6. The slide-bar, the tool-carrier pivoted thereon and provided with tools $D^2$ and $D^3$, the rocker, and the tongue adapted to be interposed between an arm of the said rocker and the said slide-bar, combined with locking mechanism, substantially as described, between the said tool-carrier and the said tongue, whereby the tongue is restrained from being moved forward between the slide-bar and arm $B^*$ of the rocker to reciprocate the said slide-bar when the tool D is in position to descend upon the material, as set forth.

7. The slide-bar, the constantly-moving rocker, and the tongue, combined with means, substantially as described, to automatically withdraw the tongue at the completion of any desired number of reciprocations of the said slide, as set forth.

8. The slide-bar $B^7$ and its pivoted tool-carrier and tools, combined with the table and the oscillating bed $E^5$, substantially as described.

9. The slide-bar $B^7$, its pivoted tool-carrier and tools, the table, and the oscillating bed thereon, having dies to co-operate with the said tools, combined with the strip-carrier and guides therefor, substantially as described.

10. The slide-bar, the tool-carrier, its tools, the table, the oscillating bed therein, and the strip-carrier, combined with an adjustable guide to enable the tools to strike the material in the strip-carrier more or less distant from the edge thereof, substantially as described.

11. The slide-bar, the tool-carrier, its tools, the table, the oscillating bed therein, and the strip-carrier, combined with an adjustable guide to enable the tools to strike the material in the strip-carrier more or less distant from the edge thereof, and with two yielding guides, one at each side the said adjustable guide, substantially as described.

12. In a machine for cutting and embossing button-holes, the ratchet-wheel $m^6$, means to move it intermittingly, and its attached adjustable wheel $m^3$, combined with the lever $c^{26}$ and its attached catch to co-operate with the said wheel $m^3$, substantially as described.

13. The cross-head $D^7$, rod $o'$, slotted disk $o^3$, the bearing-block, the clamping-nut, the threaded sleeve, and rod $p$, combined with the slide-block $C^7$ and its attached feeding-finger, substantially as described.

14. The strip-carrier, the sliding block $c^7$, the block $c^6$, pivoted thereon, and the feeding-finger, combined with an adjusting device to turn the feeding-finger more or less upon its fulcrum-pin to correctly enter the holes of the strip carrier, substantially as described.

In testimony whereof we have signed our names to this specification in the presence of two subscribing witnesses.

ZACHARY T. FRENCH.
WILLIAM C. MEYER.

Witnesses:
   G. W. GREGORY,
   C. M. CONE.